(12) United States Patent
Bunker et al.

(10) Patent No.: US 6,984,100 B2
(45) Date of Patent: Jan. 10, 2006

(54) COMPONENT AND TURBINE ASSEMBLY WITH FILM COOLING

(75) Inventors: Ronald Scott Bunker, Niskayuna, NY (US); Canan Uslu Hardwicke, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 135 days.

(21) Appl. No.: 10/611,749

(22) Filed: Jun. 30, 2003

(65) Prior Publication Data

US 2005/0123401 A1   Jun. 9, 2005

(51) Int. Cl.
F01D 5/14       (2006.01)
(52) U.S. Cl. .................. 415/115; 416/97 R; 416/97 A; 416/235
(58) Field of Classification Search ................ 415/115, 415/116; 416/96 R, 97 R, 97 A, 235
See application file for complete search history.

(56) References Cited

U.S. PATENT DOCUMENTS 3,864,199 A * 2/1975 Meginnis ..................... 428/596
6,234,755 B1 * 5/2001 Bunker et al. ............ 416/97 R

OTHER PUBLICATIONS

K. B. M. Q. Zaman, "Reduction of Jet Penetration in a Cross-flow by Using Tabs", Nasa Lewis Research Center, AIAA-98-3276, 34th AIAA/ASME/SAE/ASEE Joint Propulsion Conference & Exhibit, Jul. 13-15, 1998, Cleveland, OH, pp. 1-8.
L. J. S. Bradbury & A. H. Khadem, "The distortion of a jet by tabs", J. Fluid Mech. (1975), vol. 70, part 4, pp. 801-813.
K. B. M. Q. Zaman & J. K. Foss, "The effect of vortex generators on a jet in a cross-flow", 1997 American Institute of Physics, Phys. Fluids 9 (1), Jan. 1997, pp. 106-114.
Patent Application, Canan U. Hardwicke et al., "Systems and Methods for Determining Conditions of Articles and Methods of Making Such Systems," Appl. No. 10/065,816, filed Nov. 22, 2002.
Ronald S. Bunker, "Film Cooling Effectiveness due to Discrete Holes within a Transverse Surface Slot," IGTI Turbo Expo Int. Gas Turbine Conference and Exposition, Jun. 3-6, 2002, Amsterdam, GT-2002-30178, pp. 1-10.
Masir Hasan et al., "Film Cooling from a Single row of Cylindrical Angled Holes with Triangular Tabs having different Orientations," ASME Turbo Expo 2001, Jun. 4-7, 2001, New Orleans, Louisiana, USA, 2001-GT-0124, pp. 1-8.

(Continued)

*Primary Examiner*—Edward K. Look
*Assistant Examiner*—Dwayne J. White
(74) *Attorney, Agent, or Firm*—Penny A. Clarke; Patrick K. Patnode

(57) ABSTRACT

A component includes a wall with a cold and a hot surface. At least one film-cooling hole extends through the wall for flowing a coolant from the cold to the hot surface. The film-cooling hole defines an exit site in the hot surface. At least one flow modifier is formed on the hot surface and is adapted to direct the coolant flowing from the film-cooling hole and out of the exit site toward the hot surface. The flow modifier extends outwards from and conforms to the hot surface. A turbine assembly includes a first and a second component that define a secondary cooling slot, which receives and guides a secondary coolant flow. At least one flow modifier is formed on a surface of one of the two components and is adapted to enhance the secondary coolant flow along at least one of the two components within the secondary coolant slot.

39 Claims, 7 Drawing Sheets

OTHER PUBLICATIONS

S.V. Ekkad et al., "Film Cooling on a Flat Surface with a Single Row of Cylindrical Angled Holes: Effect of Discrete Tabs," HTD-vol. 366-3, ASME Heat Transfer Division—2000, vol. 3, pp. 3-12.

D. G. Hyams et al., "A Detailed Analysis of Film Cooling Physics: Part III-Streamwise Injection with Shaped Holes," ASME, vol. 122, Jan. 2000, pp. 122-132.

* cited by examiner

Fig. 16
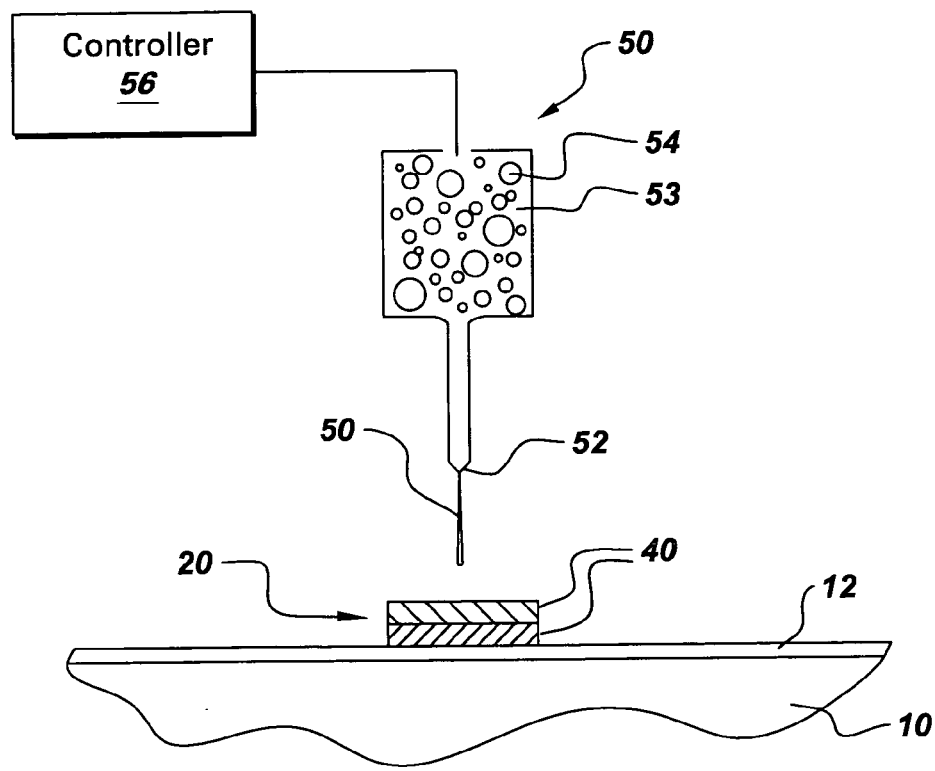
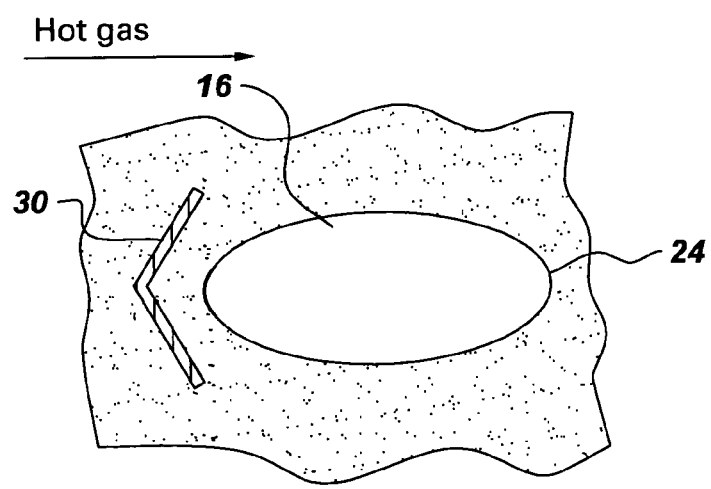
Fig. 17

Fig. 18
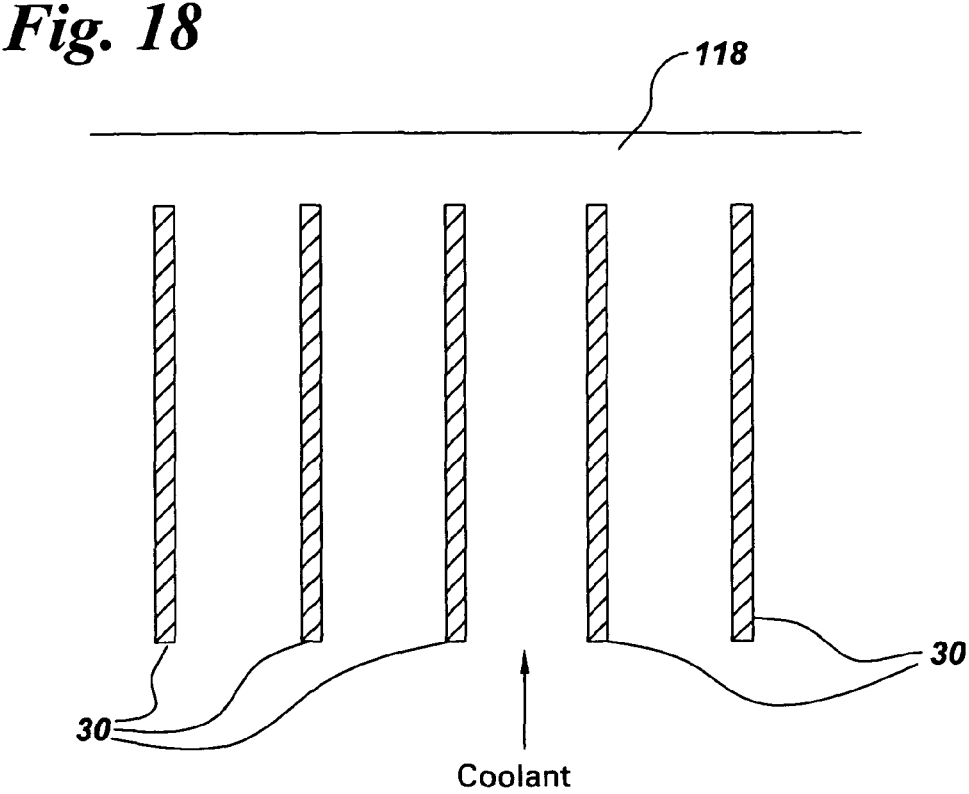
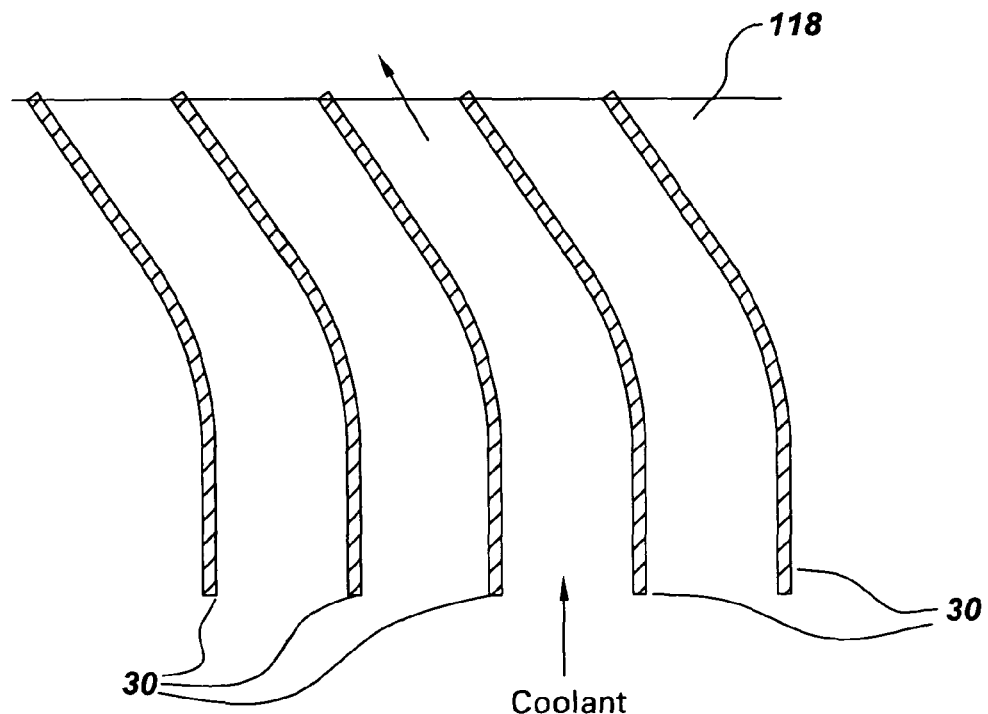
Fig. 19

US 6,984,100 B2

COMPONENT AND TURBINE ASSEMBLY WITH FILM COOLING

CROSS REFERENCE TO RELATED APPLICATIONS

This application is related to commonly assigned U.S. patent application Ser. No. 10/611,745, C. U. Hardwicke et al., entitled "Method for Forming a Flow Director on a Hot Gas Path Component" and filed concurrently herewith, which is hereby incorporated by reference in its entirety.

BACKGROUND OF THE INVENTION

The invention relates generally to hot gas path components for turbine assemblies and, more particularly, to film cooling of hot gas path components and to secondary cooling between hot gas path components. A variety of components in aircraft engines and stationary power systems are operated in extremely hot environments. These components are exposed to hot gases having temperatures up to 3400 degrees Fahrenheit, for aircraft applications, and up to about 2700 degrees Fahrenheit for stationary power generation applications. To cool the components exposed to the hot gases, these "hot gas path" components typically have both internal and film cooling. For example, a number of cooling holes may extend from a relatively cool surface of the component to a "hot" surface of the component. The hot surface is exposed to the hot gases and thus requires more thermal management than does the relatively cool surface of the component, which may itself be at a temperature of about 1000 to about 1800 degrees Fahrenheit. This technique is known as film cooling. The coolant typically is compressed air bled off the compressor, which is then bypassed around the engine's combustion zone and fed through the cooling holes to the hot surface. The coolant forms a protective "film" between the hot component surface and the hot gas flow, thereby helping protect the component from heating.

Because bleeding the coolant off the compressor reduces the overall efficiency of the engine, it is desirable to improve cooling effectiveness for a given amount of coolant. A number of techniques have been employed to enhance the effectiveness of film cooling, including using "shaped" cooling holes. Film cooling is highest when the coolant flow hugs the hot surface. However, conventional film cooling techniques can be improved to further direct and maintain the coolant flow along the hot surface.

Accordingly, it would be desirable to provide film cooling for hot gas path components with improved cooling effectiveness. More particularly, it would be desirable to further direct and maintain the coolant flow along the hot surface of the gas path component, to enhance the protective "film" effectiveness.

SUMMARY

Briefly, in accordance with one embodiment of the present invention, a component is disclosed. The component includes a wall having a cold surface and a hot surface. At least one film-cooling hole extends through the wall for flowing a coolant from the cold surface to the hot surface. The film-cooling hole defines an exit site in the hot surface of the wall. At least one flow modifier is formed on the hot surface of wall and is adapted to direct the coolant flowing from the film-cooling hole and out of the exit site toward the hot surface of the wall. The flow modifier extends outwards from the hot surface of the wall and conforms to the hot surface of the wall.

Another component embodiment of the invention is also disclosed. For this embodiment, at least one ridge is formed on the hot surface of the wall. The ridge extends along at least a portion of the exit site and further extends to a position downstream of the exit site.

A third component embodiment of the invention is also described. For this embodiment the film-cooling hole has a passage wall. At least one flow modifier is formed on the passage wall and is adapted to spread the coolant flowing from the film-cooling hole and out of the exit site laterally.

A turbine assembly of the invention is also disclosed. The turbine assembly includes a first component and a second component. The first and second components define a secondary cooling slot, which receives and guides a secondary coolant flow. At least one flow modifier is formed on a surface of one of the first and second components. The flow modifier is adapted to enhance the secondary coolant flow along at least one of the first and second components within the secondary coolant slot.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 16 illustrates a method of forming a flow director, such as a flow modifier, connector or ridge, on a component;

FIG. 17 is a top view of an exemplary flow modifier positioned upstream of the exit site of the film-cooling hole;

FIG. 18 shows an exemplary arrangement of linear flow modifiers on sides of the components shown in FIG. 15; and FIG. 19 shows an exemplary arrangement of curved flow modifiers on sides of the components shown in FIG. 15.

DETAILED DESCRIPTION

Figure 1:
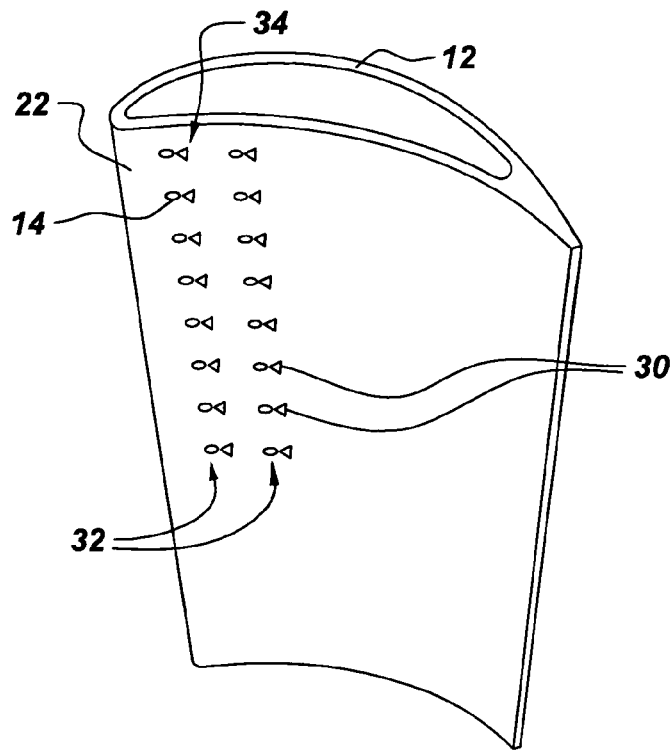
FIG. 1 shows an exemplary film-cooled airfoil with two exemplary rows of film-cooling holes.
Figure 2:
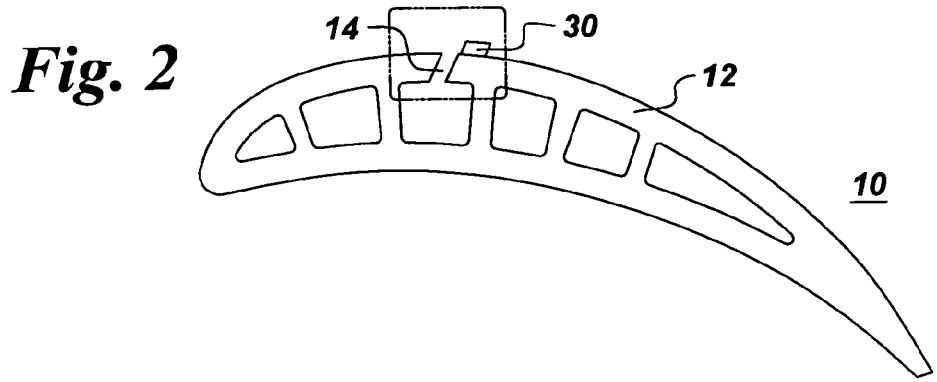
FIG. 2 shows the airfoil of FIG. 1 in cross-sectional view and depicts one of the exemplary film-cooling holes formed in the wall of the airfoil and an exemplary flow modifier formed on the hot surface of the wall.
Figure 3:
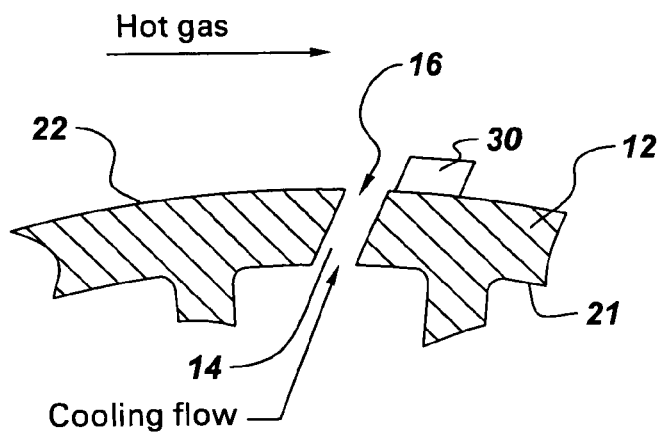
FIG. 3 is an enlarged view of the exemplary film-cooling hole and exemplary flow modifier of FIG. 2.

A component 10 with film cooling is described with respect to FIGS. 1–3. Exemplary film cooled components include hot gas path components in turbines, for example stationary vanes (nozzles), turbine blade (rotors), combustion liners, other combustion system components, transition pieces, and shrouds. The present invention is applicable to all hot gas path surfaces in a turbine engine. FIG. 1 shows an airfoil 10 as an exemplary embodiment of the component 10. The airfoil 10 is shown in cross-section in FIG. 2. The component 10 includes a wall 12 having a cold surface 21 and a hot surface 22. At least one film-cooling hole 14 extends through the wall 12 for flowing a coolant from the cold surface 21 to the hot surface 22. An exemplary film-cooling hole 14 is shown in an enlarged view in FIG. 3. An exemplary coolant is air, for example compressed air. It should be noted that the terms "hot" and "cold" surfaces are relative. As used here, the hot surface 22 is the surface of the wall 12 exposed to hot gases, and the cold surface 21 is the surface from which the coolant flows. As indicated in FIG. 3, the film-cooling hole is typically angled relative to hot and cold surfaces 22, 21. Beneficially, an angled film-cooling hole 14 provides a longer cooling length for a given wall thickness. However, for certain applications, straight film-cooling holes 14 may be employed. As shown in FIG. 3, the film-cooling hole 14 defines an exit site 16 in the hot surface 22 of the wall 12. Coolant exits the film-cooling hole 14 through the exit site 16. The component 10 further includes at least one flow modifier 30 formed on the hot surface 22 of the wall 12. The flow modifier 30 is adapted to direct the coolant flowing from the film-cooling hole 14 and out of the exit site 16 toward the hot surface 22 of the wall 12. As indicated in FIG. 3, the flow modifier 30 extends outwards from the hot surface 22 of the wall 12 and conforms to the hot surface 22 of the wall 12.

According to a particular embodiment, the flow modifier 30 extends less than about 0.7 mm from the hot surface of the wall 12 and, more particularly, the flow modifier 30 extends a distance in a range of about 0.1 mm to about 0.25 mm, from the hot surface of wall 12. The desired thickness of the flow modifier 30 depends on a number of factors, including material, geometry, type of hot gas path component 10, position on the component 10, and application.

Beneficially, the flow modifier 30 enhances the film cooling provided by the film-cooling hole 14 by directing the coolant flowing from the film-cooling hole 14 and out of the exit site 16 toward the hot surface 22 of the wall 12. The coolant provides a protective barrier that reduces the contact between the hot gases and the wall 12. The component 10 of this embodiment has two related advantages over conventional film-cooled hot gas path components. First, the component 10 can be maintained at a lower temperature relative to a conventional film-cooled hot gas path component, for a given coolant throughput. Alternatively, the amount of coolant used can be reduced, while achieving the same amount of film cooling for the component 10 of this embodiment, relative to a conventional film-cooled component. Reducing the amount of coolant used increases the efficiency of a turbine engine because less coolant is bled from the compressor (not shown).

The number of film-cooling holes 14 formed in the component 10 depends on the amount of cooling needed. The amount of cooling required depends on the application, for example stationary power generation or aircraft engine applications, as well as on the position of the component 10 in the turbine engine, for example whether the component 10 is in stage 1 or stage 2 of the turbine engine. For heavily cooled parts, for example airfoils positioned immediately after the combustion section (not shown), which see the hottest gases, on the order of 700 film-cooling holes 14 may be formed in the wall 12 of the airfoil 10. For components requiring less cooling, a few film-cooling holes 14 may suffice, and for intermediate levels of cooling, a few rows 32 of film-cooling holes 14 (corresponding to around sixty film-cooling holes 14) are used. Accordingly, the two rows 32 of film-cooling holes 14 shown in FIG. 1 are purely illustrative, with respect to both the desired number and positions of the film-cooling holes 14.

Film-cooling holes 14 are formed using a variety of techniques, including laser drilling, electrochemical machining, electrical-discharge machining, and water jet drilling. The film-cooling holes 14 are typically fairly small in diameter ranging from about 0.25 mm to about 1.8 mm in diameter. Typically, smaller diameters are used for aircraft applications, and larger diameters are used for stationary power applications. The length of the film-cooling holes 14 depends on the thickness of the wall 12. Typically, wall thickness is in a range of about 0.6 mm to about 2.5 mm for aircraft applications and in a range of about 1.3 mm to about 5 mm for stationary power generation applications.

Film-cooling holes 14 have a number of geometries, the most common being round or shaped holes. The present invention is not limited to any specific film-cooling hole geometry and encompasses, for example, round and shaped holes. Both round holes and shaped holes are known. Shaped holes are discussed, for example, in commonly assigned U.S. Pat. No. 6,368,060, Fehrenbach et al, entitled "Shaped Cooling Hole for an Airfoil," which is hereby incorporated by reference in its entirety.

Figure 4:
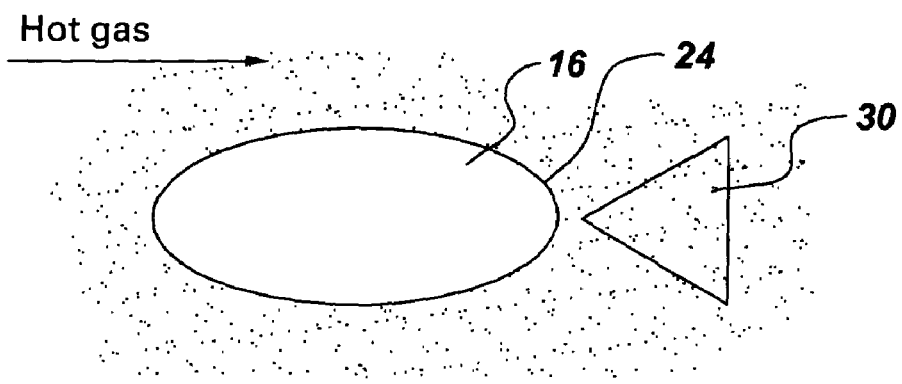
FIG. 4 is a top view of an exemplary flow modifier.
Figure 5:
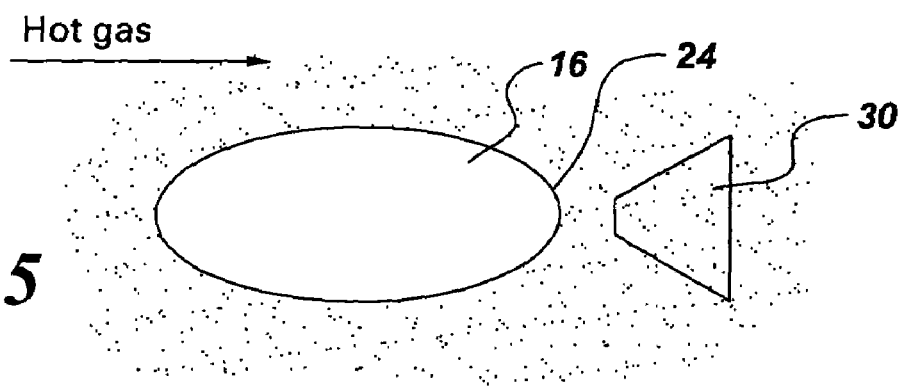
FIG. 5 is a top view of another exemplary flow modifier.
Figure 6:
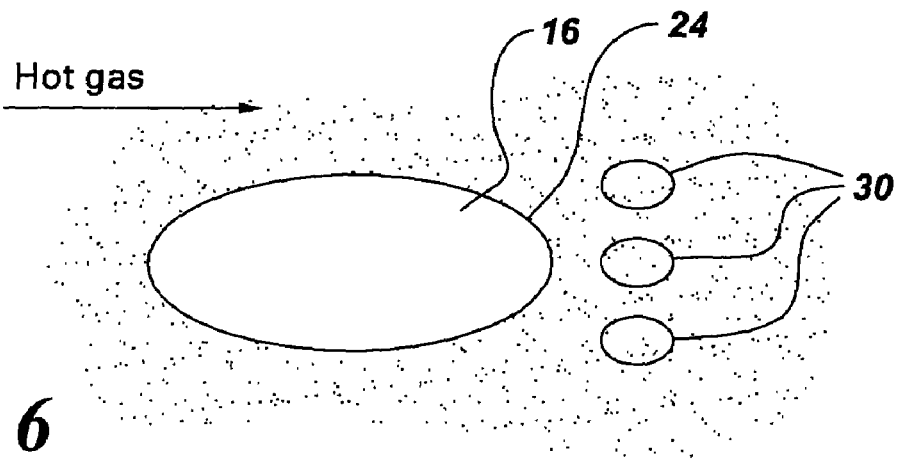
FIG. 6 is a top view of an exemplary arrangement of flow modifiers.
Figure 7:
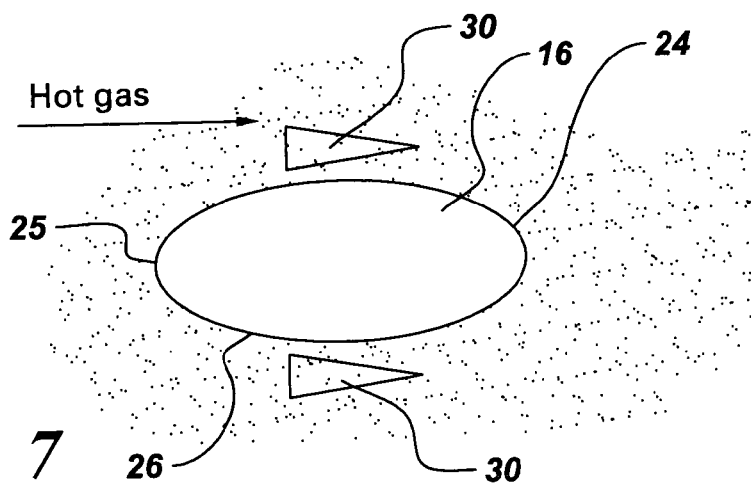
FIG. 7 is a top view of another exemplary arrangement of flow modifiers.

The flow modifier 30 is described in greater detail with reference to FIGS. 3–7 and 17. For the embodiment illustrated in FIG. 3, the flow modifier 30 is situated on the hot surface 22 of wall 12 and does not extend over the exit site 16. The flow modifier 30 may be formed in a variety of shapes. Exemplary flow modifier shapes are shown in FIGS. 4–7 and include a rounded flow modifier (FIG. 6). Triangular flow modifiers 30 are illustrated in FIGS. 4 and 7, and a trapezoidal flow modifier is shown in FIG. 5 (collectively "polygonal flow modifiers"). The rounded flow modifiers 30 may be circular (as shown) or elliptical in cross-section. Further, although the flow modifiers 30 are shown as regular shapes (circles, triangles etc) for simplicity, the flow modifiers 30 may also be irregularly shaped.

As illustrated in FIGS. 6 and 7, for example, a number of flow modifiers 30 may be associated with each of the exit sites 16. In other words, for certain embodiments, there are a number of flow modifiers 30 for each film-cooling hole 14.

FIG. 17 shows another exemplary flow modifier 30 embodiment. As shown, a v-shaped flow modifier 30 is positioned upstream of the exit site 16 of the film-cooling hole 14 to divert the hot gases around the exit site 16.

The flow modifiers 30 are positioned relative to the exit site 16 in order to enhance the flow of coolant from film-cooling hole 14 and through exit site 16 toward the hot surface 22 of the component wall 12. Other criteria for positioning the flow modifiers 30 include directly blocking the flow of hot gases toward the hot surface 22 of the wall 12. For the embodiments of FIGS. 4–6, the flow modifiers 30 are positioned on the downstream side 24 of the exit site 16. For the embodiment illustrated in FIG. 7, the flow modifiers 30 are positioned on the lateral sides 26 of the exit site 16. Flow modifiers 30 may be arranged on both the downstream and lateral sides 24, 26 of the exit site. (For brevity, this arrangement is not illustrated.) In addition, the flow modifiers 30 may positioned on the upstream side 25 of the exit site 16.

As discussed above, a number of film-cooling holes 14 may be desirable to achieve the desired level of cooling. Accordingly, for a specific embodiment, the component 10 includes a number of film-cooling holes 14 extending through the wall 12 for flowing a coolant from the cold surface 21 to the hot surface 22 of the wall 12. Each of the film-cooling holes defines a respective exit site 16 in the hot surface 22 of the wall 12. As indicated in FIG. 1, for example, the film-cooling holes 14 are arranged in at least one row 32. A number of flow modifiers 30 are formed on the hot surface 22 of the wall. As indicated in FIG. 1, at least one of the flow modifiers 30 is associated with a respective one of the film-cooling holes 14 and is adapted to direct the coolant flowing from the respective film-cooling hole 14 and out of the respective exit site 16 toward the hot surface 22 of the wall 12. For the embodiment illustrated in FIG. 1, the film-cooling holes 14 are arranged in a number of rows 32. At least a subset 34 of the flow modifiers 30 are situated between the rows 32 of film-cooling holes 14. The flow modifiers 30 situated between the rows 32 are adapted to enhance the flow of coolant along the hot surface 22 between the rows 32.

Figure 8:
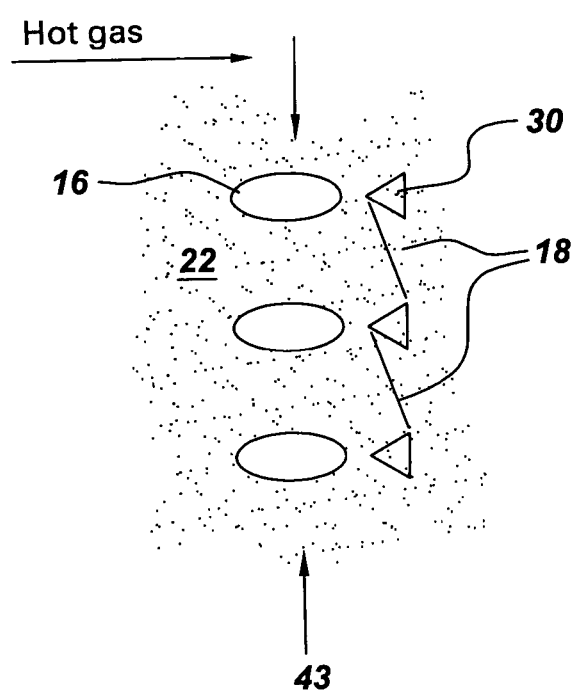
FIG. 8 shows an exemplary arrangement of film-cooling holes, flow modifiers and connectors for a hot gas path component.
Figure 9:
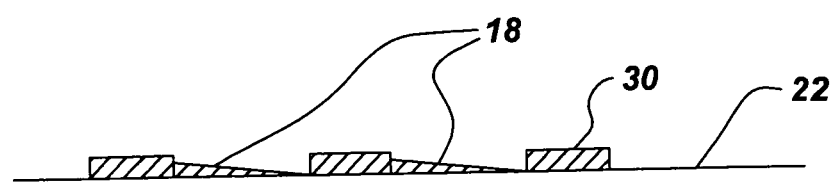
FIG. 9 is a view of the flows modifiers and connectors of FIG. 8 taken along the line 43.

A more particular embodiment is illustrated in FIGS. 8 and 9. FIG. 8 shows an exemplary arrangement of film-cooling holes, flow modifiers and connectors for a hot gas path component. FIG. 9 is a view of the flows modifiers and connectors of FIG. 8 taken along the line 43. For this embodiment, the component 10 includes a number of film-cooling holes 14. As shown, a number of connectors 18 are formed on the hot surface 22 of the wall 12. Each of the connectors extends outwards from the hot surface 22 of the wall 12 and conforms to the hot surface 22 of the wall 12, as indicated in FIG. 9. The connectors 18 are adapted to enhance interaction between each of a number of coolant flow streams associated with the respective film-cooling holes 14.

Figure 10:
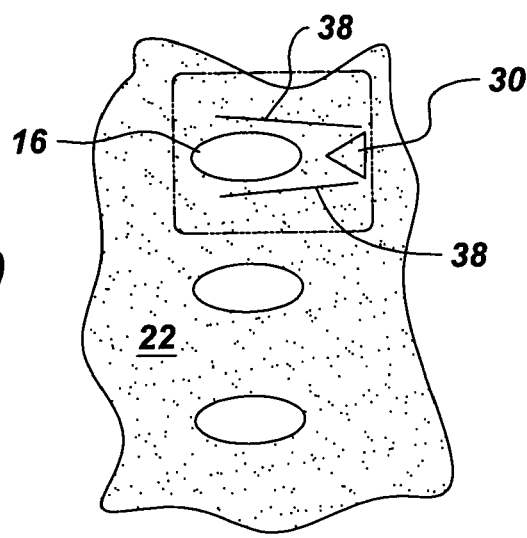
FIG. 10 shows an exemplary flow modifier and pair of ridges formed on the hot surface of the component wall.

FIG. 10 shows the hot surface 22 of the component wall 12, with two exemplary ridges 38 formed on the hot surface 22. As shown, the ridges extend along at least a portion of the exit site 16 and further extend to a position downstream of the exit site 16. The ridges 38 may be rounded or angled and may have constant or varying dimensions. The ridges 38 may be used in conjunction with flow modifiers 30, as shown in FIG. 10. Alternatively, the component 10 may include either ridges 38 or flow modifiers 30. According to a more particular embodiment, the ridges 38 extend outwards from the hot surface 22 of the wall 12 and conform to the hot surface 22, as indicated for example in FIG. 11. For certain embodiments, the component 10 includes a number of ridges 38, where at least two ridges 38 extend along at least a portion of the exit site 16 of a respective film-cooling hole 16 and further extend downstream of the respective exit site 16, as shown for example in FIG. 10.

As discussed above with respect to the flow modifier 30 embodiments, the component 10 typically includes a number of film-cooling holes 14. For particular embodiments, the film-cooling holes are arranged in several rows 32, including a first and a second row 32, as shown for example in FIG. 12. A number of ridges 38 are formed on the hot surface 22 of the component wall 12. For the arrangement of FIG. 12, the ridges 38 extend along at least a portion of the exit sites 16 in the first row 32 and further extend downstream of the exit sites 16 in the second row 32.

Figure 13:
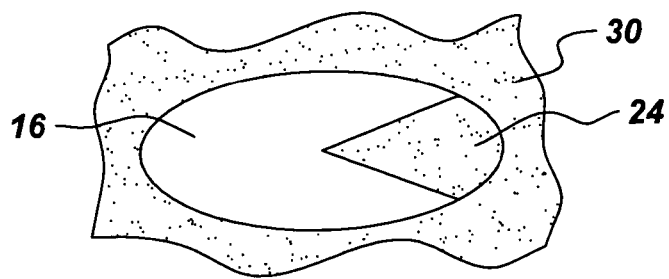
FIG. 13 is a top view of another flow modifier embodiment.
Figure 14:
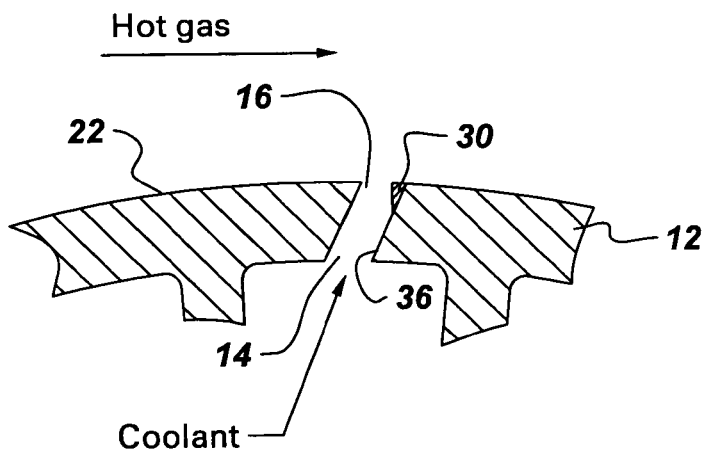
FIG. 14 is a side view of the flow modifier of FIG. 13.

For the embodiments discussed above, the flow modifiers 30 are formed on the component wall. Another flow modifier 30 embodiment is illustrated in FIGS. 13 and 14. As shown in FIG. 14, the flow modifier 30 is formed on the passage wall 36 and is adapted to spread the coolant flowing from the film-cooling hole 14 and out of the exit site 16 laterally. For the particular embodiment shown in FIG. 14, the flow modifier 30 is coextensive with the hot surface 22 of the component wall 12. For another embodiments (not shown in side view), the flow modifier 30 extends out of the exit site 16 and above the hot surface 22 of the component wall 12. For another embodiment (also not shown in side view), the flow modifier 30 is contained within film-cooling hole 14 and does not reach the hot surface 22 of the wall 12. The flow modifiers 30 formed within film-cooling hole 14 may have the various shapes discussed above. For example, the flow modifier 30 may be rounded, including circular or elliptical shapes. The flow modifier 30 may also be polygonal, for example triangular or trapezoidal. The flow modifier 30 may also be irregularly shaped, including a combination of rounded and angular features. In addition, a number of flow modifiers 30 may be formed within each exit site 16. For the particular embodiment of FIG. 14, the flow modifier 30 is positioned on a downstream side 24 of the exit site 16. Further, as discussed above, the film-cooling holes 14 are not limited to a specific geometry. For example, the flow modifier 30 may be formed in both round holes and shaped holes.

A turbine assembly 100 embodiment is described with reference to FIG. 15. As indicated, the turbine assembly 100 includes a first component 110 and a second component 112. The first and second components 110, 112 define a cooling slot 114. The cooling slot 114 receives and guides a secondary coolant flow. Exemplary components 110, 112 that define a cooling slot 114 include: a combustor and a turbine inlet nozzle, a combustor and a nozzle (stationary vane), a nozzle and a blade, a nozzle and a shroud, a blade and a shroud, two nozzles, and two blades. The turbine assembly further includes at least one flow modifier 30 formed on a surface of one of the first and second components 110, 112. For example, if the component is a blade, the flow modifier may be formed on the platform. If the component is a nozzle, the flow modifier may be formed on an end wall. If the component is a shroud, the flow modifier 30 may be formed on the shroud. The flow modifier 30 is adapted to enhance the secondary coolant flow along at least one of the first and second components 110, 112 within the coolant slot 114. In this manner, the flow modifier 30 enhances the cooling of the components 110, 112 by the secondary coolant flow.

Figure 15:
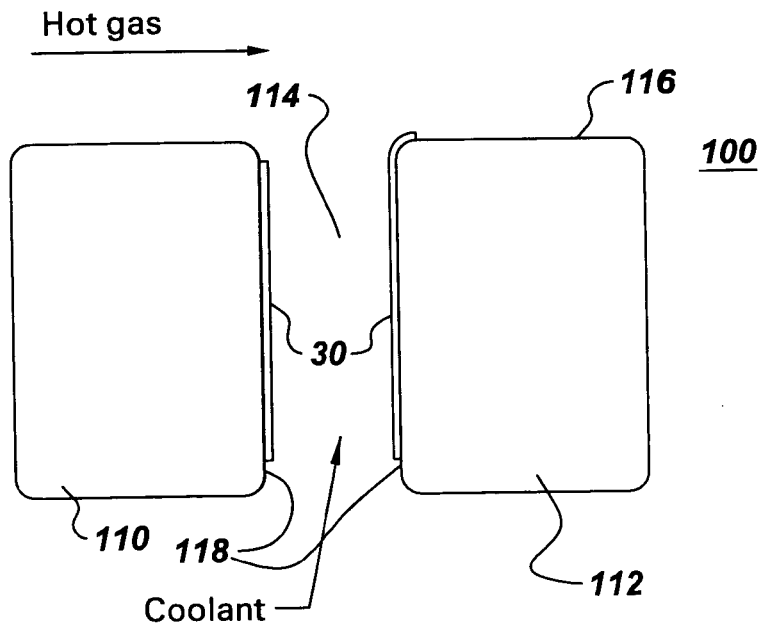
FIG. 15 illustrates a turbine assembly embodiment of the invention.

Two exemplary flow modifier 30 configurations are shown in FIG. 15. The exemplary flow modifier 30 shown on the first component 110 extends partially along the slot 114, whereas the exemplary flow modifier 30 shown on the second component 112 extends along the slot 114 and onto the hot gas path surface 116 of the second component 112. Beneficially, extending the flow modifier 30 onto the hot gas path surface 116 transitions the coolant flow to further enhance protection of the surface 116 by reducing mixing of the coolant with the hot gases. FIGS. 18 and 19 show exemplary arrangements of flow modifiers 30 on the sides 118 of the components 110, 112 that face the slot 114. More particularly, FIG. 18 illustrates an arrangement of linear flow modifiers 30 configured to act as radial surface guides for the coolant. FIG. 19 illustrates an arrangement of arcuate flow modifiers 30 also configured to act as radial surface guides for the coolant. Beneficially, the curved flow modifiers of FIG. 19 impart swirl to the coolant flow exiting the slot 114 to better match the hot gas flow, thereby reducing mixing losses.

For the embodiment shown in FIG. 15, the flow modifier 30 extends into cooling slot 114. The flow modifier 30 is described above. According to a particular embodiment (not expressly shown), the flow modifier 30 forms a ridge 38 extending along one of the components 110, 112.

A method embodiment for forming a flow director 20 on a component 10 comprising a wall 12 is described with reference to FIG. 16. As noted above, exemplary components 10 include hot gas components 10 for turbine assemblies 100. The method includes depositing at least one layer 40 on the wall of the component 10. The deposition includes shaping the layer 40 in accordance with a predetermined shape to form the flow director 20. The predetermined shape can be any desired shape. Because the flow director is formed by depositing one or more layers 40 on the wall 12, the flow director 20 conforms to the wall 12 of the component 10. For a particular embodiment, the deposition comprises depositing a number of layers 40 on the wall 12 of the component 10 and shaping the layers 40 in accordance with the predetermined shape to form the flow director 20. It should be understood that "the predetermined shape" refers to the overall shape of the flow director 20 and that the respective layers 40 may have different dimensions. Although only shown from a side view, the flow director 20 is three-dimensional, and exemplary flow directors 20 include connectors 18, flow modifiers 30, and ridges 38, which are described above.

The layers 40 may be formed from a number of materials, and exemplary layers 40 are formed of metal, ceramic or combinations thereof. For example, one or more metal layers may be deposited on a metallic or ceramic component 10. Similarly, one or more ceramic layers 40 may be deposited on a metallic or ceramic component 10. Exemplary ceramics include ceramic matrix composites and monolithic ceramics. Moreover, the layer 40 and component 10 materials need not coincide. For example, one or more ceramic layers 40 may be deposited on a metal component 10. The layers 40 may also form a graded material, for example a ceramic layer 40 formed on a metallic layer 40. In addition, the layers 40 may be formed on a coating on the wall 12. This latter configuration is also intended to be encompassed by the phrase "depositing on the wall 12." In addition, other coatings may be deposited on the wall 12 over the one or more layers 40, for example thermal barrier coatings (not shown).

Figure 11:
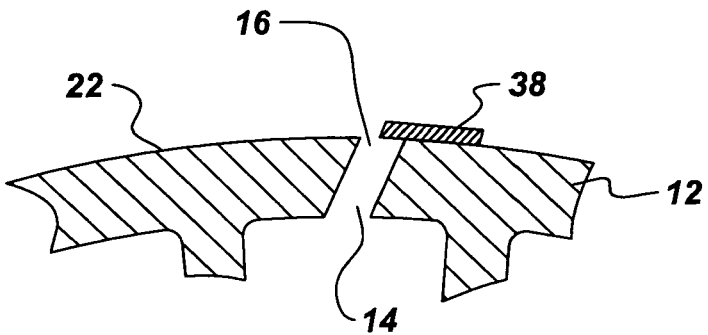
FIG. 11 is an enlarged view of the exemplary film-cooling hole and exemplary ridge of FIG. 10, with the flow modifier omitted.

For the embodiments of FIGS. 3 and 11, the wall 12 has a cold surface 21 and a hot surface 22, and the film-cooling hole 14 extends through the wall 12 for flowing a coolant from the cold surface 21 to the hot surface 22. The film-cooling hole 14 defines an exit site 16 in the hot surface 22 of the wall 12. For this embodiment, the deposition comprises depositing one or more layers 40 on the hot surface 22 of the wall. For the particular embodiment of FIG. 3, the flow director 20 takes the form of a flow modifier 30 adapted to direct the coolant flowing from the film-cooling hole 14 and out of the exit site 16 toward the hot surface 22 of the wall 12. The one or more layers 40 may be shaped in a number of geometries to form a flow modifier 30 having any of the geometries discussed above with respect to FIGS. 4–7, for example.

Figure 12:
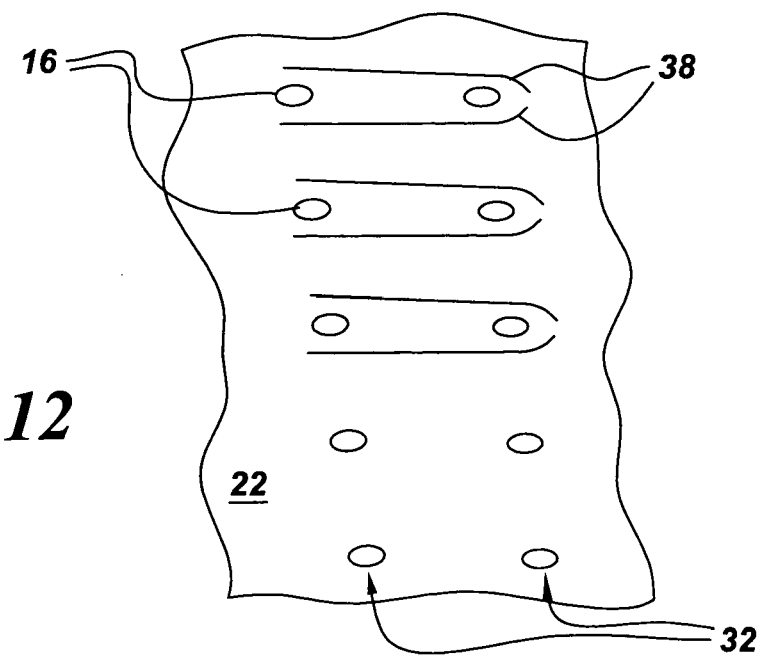
FIG. 12 depicts an exemplary arrangement of film-cooling hole exit sites and ridges.

For the embodiment of FIGS. 11 and 12, the flow director 20 takes the form of a ridge 38 extending along at least a portion of the exit site 16 and further extending to a position downstream of the exit site 16. The one or more layers 40 may be shaped to form a rounded or angled ridge 38 and to form a ridge with constant or varied dimensions (for example, width and depth).

An exemplary deposition process is described with reference to FIG. 16. As indicated, the deposition process includes delivering a mixture 50 through a nozzle 52 (sometimes called a "pen" 52) onto the wall 12 to form the layer 40. The mixture 50 comprises a powder 54 dispersed in a liquid medium 53. This deposition process is commonly called the "direct write" process. "Direct write" processes encompass numerous ways to deposit layers on components. One example of a "direct write" process is the "pen-type." More particularly, for a pen-type deposition system, the mixture 50 is forced through the nozzle 52 at a controlled rate, to achieve a desired layer 40 geometry. As used here, the term "geometry" encompasses shape and dimensions. An exemplary dimension is thickness. The size of the nozzle 52 orifice is selected to provide a desired dimension (for example, width) for each pass of the nozzle 52. Exemplary sizes of the nozzle 52 orifice range from about 0.010 mm to about 1.0 mm. During the deposition, the nozzle 52 is displaced relative to the wall 12 to form the layer(s) 40 in accordance with the predetermined shape. By "displaced," it is meant that either the nozzle 52 or the wall 12 is moved or both the nozzle 52 and the wall 12 are moved. Typically, the wall 12 is moved. The predetermined shape may be generated and stored in a computer as a CAD/CAM file. As indicated in FIG. 16, the movement of the nozzle 52 relative to the wall 12 may be controlled, for example by a controller 56, to form the layer(s) 40 in accordance with the predetermine shape. An exemplary controller 56 is a computer 56 operating a CAD/CAM program. In this manner, the layer shape and thickness and other parameters are precisely controlled.

Beneficially, the nozzle 52 can follow along the component wall 12 at a controlled distance therefrom, for example with a separation less than about 25 micrometers. In this manner one or more layers 40 having a substantially uniform thickness may be deposited rapidly and precisely on the component wall 12. Beneficially, the layers 40 may be deposited rapidly and precisely on a complex-shaped component wall 12 in an automated manner.

As noted above, the powder 54 of the layer material or its precursor is dispersed in a liquid solvent medium 53, such as an alcohol, which can optionally contain a binder, surfactant, or other additives to enhance properties such as adhesion and wetting of the mixture 50 on the wall 12, or a rheology modifier to adjust the viscosity of the mixture 50. Typically, the consistency of the mixture 50 resembles that of toothpaste. The mixture 50 may also include a material that promotes the conversion of a metallic ingredient to a compound thereof or as pore formers in the heat treated structure. The mixture 50 may also include a temporary binder, such as starch or cellulose, to enhance the integrity of the deposited layer(s) 40 before any subsequent treatment thereof. Formation of the mixture 50 may include mixing the powder 54 and liquid medium 53, as well as any optional surfactant, temporary binder, and any other constituents of the mixture 50 in a conventional mixer (not shown), such as a rotating canister, high-speed blender, ribbon blender, or shear mixer like a roll mill.

To remove the liquid medium 53 and to consolidate the layer(s) 40, a particular embodiment of the method further includes heating the layer 40 by itself or with the component to a predetermined temperature. Exemplary heat treatments include focused energy sources such as plasma, laser or electron beam heating or another local heat source. Alternatively, the heat treatment may comprise heating the component 10 in a furnace (not shown), provided the sintering temperature of the layer(s) 40 is below the softening point of the component 10.

In order to form a number of flow directors 20 on the component wall 12, the deposition is repeated a number of times at a number of positions on the component wall 12, according to a more particular embodiment.

The method may also be employed to form one or more flow directors 20 for the turbine assembly embodiment of FIG. 15.

Other exemplary deposition processes include chemical vapor deposition, ion plasma deposition, electron beam physical vapor deposition, and electroplating. These deposition processes may include one or more masking steps.

Although only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A component comprising:
   a wall having a cold surface and a hot surface;
   at least one film-cooling hole extending through said wall for flowing a coolant from the cold surface to the hot surface, said film-cooling hole defining an exit site in the hot surface of said wall; and
   a plurality of flow modifiers for each of the at least one exit sites, each of the flow modifiers being formed on the hot surface of said wall and adapted to direct the coolant flowing from said film-cooling hole and out of the exit site toward the hot surface of said wall, wherein said flow modifier extends outwards from the hot surface of said wall and conforms to the hot surface of said wall,
   wherein said at least one flow modifier does not extend over the exit site.

2. A component comprising:
   a wall having a cold surface and a hot surface;
   at least one film-cooling hole extending through said wall for flowing a coolant from the cold surface to the hot surface, said film-cooling hole defining an exit site in the hot surface of said wall; and
   at least one flow modifier formed on the hot surface of said wall and adapted to direct the coolant flowing from said film-cooling hole and out of the exit site toward the hot surface of said wall, wherein said flow modifier extends outwards from the hot surface of said wall and conforms to the hot surface of said wall, wherein said at least one flow modifier does not extend over the exit site, and wherein said at least one flow modifier is rounded.

3. A component comprising:
   a wall having a cold surface and a hot surface;
   at least one film-cooling hole extending through said wall for flowing a coolant from the cold surface to the hot surface, said film-cooling hole defining an exit site in the hot surface of said wall; and
   at least one flow modifier formed on the hot surface of said wall and adapted to direct the coolant flowing from said film-cooling hole and out of the exit site toward the hot surface of said wall, wherein said flow modifier extends outwards from the hot surface of said wall and conforms to the hot surface of said wall, wherein said at least one flow modifier does not extend over the exit site, and wherein said at least one flow modifier is polygonal.

4. The component of claim 1, wherein said flow modifiers are positioned on a downstream side of the exit site.

5. The component of claim 1, wherein said flow modifiers are positioned on at least one of a lateral side of the exit site.

6. The component of claim 1, wherein at least one of said flow modifiers is positioned on a downstream side of the exit site, and wherein at least one of said flow modifiers is positioned on a lateral side of the exit site.

7. The component of claim 3, wherein said at least one flow modifier extends less than about 0.76 mm from the hot surface of said wall.

8. The component of claim 3, wherein said at least one flow modifier extends a distance in a range of about 0.13 mm to about 0.25 mm, from the hot surface of said wall.

9. The component of claim 2 wherein said at least one flow modifier is positioned on a downstream side of the exit site.

10. A component comprising:
    a wall having a cold surface and a hot surface;
    at least one film-cooling hole extending through said wall for flowing a coolant from the cold surface to the hot surface, said film-cooling hole defining an exit site in the hot surface of said wall; and
    at least one flow modifier formed on the hot surface of said wall and adapted to direct the coolant flowing from said film-cooling hole and out of the exit site toward the hot surface of said wall, wherein said flow modifier extends outwards from the hot surface of said wall and conforms to the hot surface of said wall, wherein said at least one flow modifier does not extend over the exit site, and wherein said at least one flow modifier is positioned on a lateral side of the exit site.

11. The component of claim 1, wherein said at least one film-cooling hole comprises a round hole.

12. The component of claim 1, wherein said at least one film-cooling hole comprises a shaped hole.

13. The component of claim 2, comprising:
    a plurality of film-cooling holes extending through said wall for flowing a coolant from the cold surface to the hot surface, each of said film-cooling holes defining a respective exit site in the hot surface of said wall, wherein said film-cooling holes are arranged in at least one row; and
    a plurality of flow modifiers formed on the hot surface of said wall, wherein at least one of said flow modifiers is associated with each of said film-cooling holes and adapted to direct the coolant flowing from the respective film-cooling hole and out of the respective exit site toward the hot surface of said wall.

14. The component of claim 13, further comprising a plurality of connectors formed on the hot surface of said wall, each of said connectors extending outwards from the hot surface of said wall and conforming to the hot surface of said wall, wherein said connectors are adapted to enhance interaction between each of a plurality of coolant flow streams associated with the respective film-cooling holes.

15. The component of claim 13, wherein said film-cooling holes are arranged in a plurality of rows, and wherein at least a subset of said flow modifiers are situated between the rows of film-cooling holes, and wherein said flow modifier situated between the rows are adapted to enhance the flow of coolant along the hot surface between the rows.

16. A component comprising:
a wall having a cold surface and a hot surface;
at least one film-cooling hole extending through said wall for flowing a coolant from the cold surface to the hot surface, said film-cooling hole defining an exit site in the hot surface of said wall;
at least one flow modifier formed on the hot surface of said wall and adapted to direct the coolant flowing from said film-cooling hole and out of the exit site toward the hot surface of said wall, wherein said flow modifier extends outwards from the hot surface of said wall and conforms to the hot surface of said wall; and
at least one ridge formed on the hot surface of said wall, wherein said at least one ridge extends along at least a portion of the exit site and further extends to a position downstream of the exit site.

17. The component of claim 1, wherein said component comprises a hot gas path component.

18. A component comprising:
a wall having a cold surface and a hot surface;
at least one film-cooling hole extending through said wall for flowing a coolant from the cold surface to the hot surface, said film-cooling hole defining an exit site in the hot surface of said wall; and
at least one ridge formed on the hot surface of said wall, wherein said at least one ridge extends along at least a portion of the exit site and further extends to a position downstream of the exit site.

19. The component of claim 18, wherein said at least one ridge extends outwards from the hot surface of said wall and conforms to the hot surface of said wall.

20. The component of claim 19, comprising a plurality of ridges, wherein at least two ridges extend along at least a portion of the exit site and further extend downstream of the exit site.

21. The component of claim 19, comprising a plurality of film-cooling holes extending through said wall for flowing a coolant from the cold surface to the hot surface, each of said film-cooling holes defining a respective exit site in the hot surface of said wall, wherein said film-cooling holes are arranged in at least a first and a second row; and
a plurality of ridges formed on the hot surface of said wall, wherein at least a subset of said ridges extend along at least a portion of the exit sites in the first row and further extend downstream of the exit sites in the second row.

22. The component of claim 18, wherein said component comprises a hot gas path component.

23. A component comprising:
a wall having a cold surface and a hot surface;
at least one film-cooling hole extending through said wall for flowing a coolant from the cold surface to the hot surface, said film-cooling hole defining an exit site in the hot surface of said wall and having a passage wall; and
at least one flow modifier formed on the passage wall and adapted to spread the coolant flowing from said film-cooling hole and out of the exit site laterally.

24. The component of claim 23, wherein said at least one flow modifier is coextensive with the hot surface of said wall.

25. A component comprising:
a wall having a cold surface and a hot surface;
at least one film-cooling hole extending through said wall for flowing a coolant from the cold surface to the hot surface, said film-cooling hole defining an exit site in the hot surface of said wall and having a passage wall; and
at least one flow modifier formed on the passage wall and adapted to spread the coolant flowing from said film-cooling hole and out of the exit site laterally, wherein said at least one flow modifier extends out of the exit site and beyond the hot surface of said wall.

26. The component of claim 23, wherein said at least one flow modifier is contained within said film-cooling hole and does not reach the hot surface of said wall.

27. The component of claim 23, wherein said at least one flow modifier is rounded.

28. The component of claim 23, wherein said at least one flow modifier is polygonal.

29. The component of claim 23, comprising a plurality of flow modifiers for each of the at least one exit sites.

30. The component of claim 29, wherein said flow modifiers are positioned on a downstream side of the exit site.

31. The component of claim 23, wherein said at least one flow modifier is positioned on a downstream side of the exit site.

32. The component of claim 23, wherein said at least one film-cooling hole comprises a round hole.

33. The component of claim 23, wherein said at least one film-cooling hole comprises a shaped hole.

34. The component of claim 23, wherein said component comprises a hot gas path component.

35. A turbine assembly comprising:
a first component;
a second component, said first and second components defining a cooling slot, wherein said cooling slot receives and guides a secondary coolant flow; and
at least one flow modifier formed on a surface of one of said first and second components, wherein said at least one flow modifier is adapted to enhance the secondary coolant flow along at least one of said first and second components within said coolant slot, wherein said at least one flow modifier forms a ridge extending along the respective one of said first and second components, and wherein the ridge extends onto a hot gas path surface of the respective one of said first and second components.

36. The component of claim 3, wherein said at least one flow modifier is positioned on a downstream side of the exit site.

37. The component of claim 3, comprising:
a plurality of film-cooling holes extending through said wall for flowing a coolant from the cold surface to the hot surface, each of said film-cooling holes defining a respective exit site in the hot surface of said wall, wherein said film-cooling holes are arranged in at least one row; and
a plurality of flow modifiers formed on the hot surface of said wall, wherein at least one of said flow modifiers is associated with each of said film-cooling holes and adapted to direct the coolant flowing from the respective film-cooling hole and out of the respective exit site toward the hot surface of said wall.

38. The component of claim 37, further comprising a plurality of connectors formed on the hot surface of said wall, each of said connectors extending outwards from the hot surface of said wall and conforming to the hot surface of said wall, wherein said connectors are adapted to enhance interaction between each of a plurality of coolant flow streams associated with the respective film-cooling holes.

39. The component of claim 38, wherein said film-cooling holes are arranged in a plurality of rows, and wherein at least a subset of said flow modifiers are situated between the rows of film-cooling holes, and wherein said flow modifier situated between the rows are adapted to enhance the flow of coolant along the hot surface between the rows.

* * * * *